(12) United States Patent
Sculler et al.

(10) Patent No.: US 10,064,489 B2
(45) Date of Patent: Sep. 4, 2018

(54) FLAT PANEL DISPLAY WALL MOUNTING SYSTEM

(71) Applicant: Twin-Star International, Inc., Delray Beach, FL (US)

(72) Inventors: Steven Sculler, Boynton Beach, FL (US); Steven Remy, Chicago, IL (US)

(73) Assignee: Twin-Star International, Inc., Delray Beach, FL (US)

( * ) Notice: Subject to any disclaimer, the term of this patent is extended or adjusted under 35 U.S.C. 154(b) by 0 days.

(21) Appl. No.: 15/485,777

(22) Filed: Apr. 12, 2017

(65) Prior Publication Data

US 2017/0295933 A1 Oct. 19, 2017

Related U.S. Application Data

(60) Provisional application No. 62/322,201, filed on Apr. 13, 2016.

(51) Int. Cl.
*F16M 13/02* (2006.01)
*A47B 97/00* (2006.01)
*F16M 11/04* (2006.01)

(52) U.S. Cl.
CPC ......... *A47B 97/001* (2013.01); *F16M 11/041* (2013.01); *F16M 13/02* (2013.01); *F16M 2200/028* (2013.01)

(58) Field of Classification Search
CPC ....... F16M 13/02; F16M 13/00; H05K 5/0221
See application file for complete search history.

(56) References Cited

U.S. PATENT DOCUMENTS

| | | | |
|---|---|---|---|
| 9,699,924 B2* | 7/2017 | Hagen | H05K 5/0221 |
| 9,765,923 B2* | 9/2017 | Skull | F16M 13/02 |
| 2008/0237423 A1* | 10/2008 | Franzone | A47B 96/068 248/250 |
| 2009/0313843 A1* | 12/2009 | Compton | A47G 1/205 33/613 |

* cited by examiner

*Primary Examiner* — Amy Jo Sterling
(74) *Attorney, Agent, or Firm* — McDonald Hopkins LLC

(57) ABSTRACT

A flat panel mounting system includes a TV bracket and a wall bracket. The TV bracket is adapted to be mounted to a flat display. The TV bracket includes a flange extending from an elongate panel thereof and a lip extending from the flange. The wall bracket is adapted to be mounted to a wall and includes a flange extending from an elongate panel thereof. The flange and elongate panel of the wall bracket define a laterally extending channel. The wall bracket also includes a flapper moveable within the channel between forward and rearward positions. When the TV bracket is placed on the wall bracket in an assembled position, the flange and lip of the TV bracket is received within the channel and is prohibited from being removed from the channel by the flapper via coaction between the lip and the flapper while the flapper is in the forward position.

14 Claims, 6 Drawing Sheets

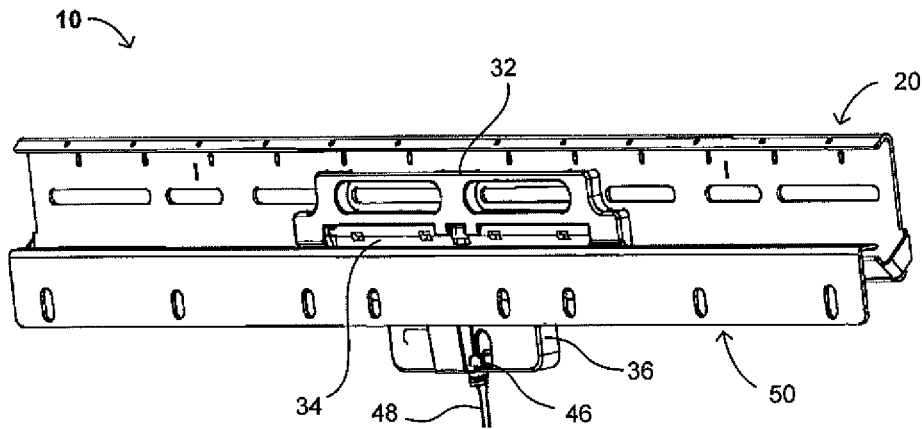
FIG. 7A
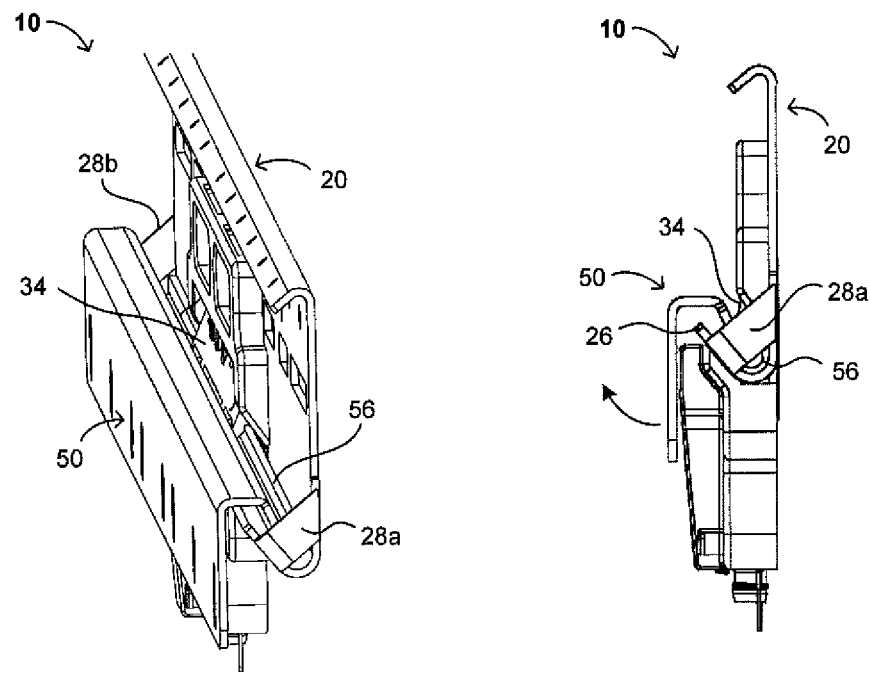
FIG. 7B  FIG. 7C

FLAT PANEL DISPLAY WALL MOUNTING SYSTEM

CROSS-REFERENCE TO RELATED APPLICATIONS

This application claims the benefit of the filing date of U.S. Provisional No. 62/322,201 filed Apr. 13, 2016, the disclosure of which is hereby incorporated herein by reference.

BACKGROUND OF THE INVENTION

Flat panel displays, such as flat panel TVs are often mounted on walls using a bracket secured directly to studs within the wall (a wall bracket), and a separate bracket that is secured to the back of the flat panel display (a TV bracket). After a TV bracket is secured to the back of a flat panel TV, it may then be secured onto a wall bracket. The mounted TV then appears to float generally parallel to the wall.

There are many types of wall brackets. In some cases, wall brackets have been mounted directly into sheetrock with common sheetrock anchors. However, this arrangement is not desirable for large display panels as there are often weight limitations and other functionality restrictions. Such prior art wall brackets have also presented safety concerns as they can be readily pulled out of the wall. To address such safety concerns, other wall brackets are mounted directly into wood or metal studs arranged behind the sheetrock wall. While these prior art brackets provide a more secure and reliable mounting arrangement, it is often difficult for a typical user to find the precise location of the studs behind the sheetrock wall. Securing a wall bracket into studs behind a sheetrock wall has become even more difficult with modern brackets as the attachment pattern for TV brackets on the rear of the TV panel has become smaller in recent years as the weight of the associated flat panel TV has decreased. Thus, users will often retain a professional to hang TVs with this type of flat panel mounting system.

Another problem with prior art flat panel mounting systems relate to inefficient structures to lock the TV bracket onto the wall bracket. Yet another problem with prior art flat panel mounting systems relates to the lack of space between the back of the TV and the wall after a flat panel TV is mounted so that access to cable connections and the like is restricted. Despite the many variations and improvements over the years in flat panel mounting systems, further improvement is desirable to address the foregoing problems.

BRIEF SUMMARY OF THE INVENTION

One aspect of the present invention provides a flat panel wall mounting system having a wall bracket and a TV bracket, where the wall bracket can be secured into a sheetrock wall without the need to secure it to studs behind the sheetrock.

Another aspect of the flat panel mounting system relates to an improved locking structure for securing a TV bracket to a wall bracket. This aspect of the present invention is obtained through biasing the TV bracket and wall bracket into a locked (i.e., engaged) position at rest so that automatic locking is obtained. Another aspect of the present invention relates to a toggle feature associated with the locking mechanism between the TV bracket and the wall bracket, where the lock can be readily disengaged after a TV bracket is locked into a secured position with an associated flat panel TV on a wall bracket, and where a user can readily toggle the locking mechanism back into a secured engaged state.

Still another aspect of the present invention relates to an improved tilting feature, which permits access to electrical, cable, and audio/video connections as well as control switches arranged at the back of an associated flat panel display screen when mounted on a wall.

Yet another aspect of the present invention relates to an improved "no-stud mounting system." In a preferred embodiment, the wall bracket may include an elongated angled structure extending along a substantial portion thereof with apertures to facilitate securing the wall bracket directly into a sheetrock wall without the need to secure such wall bracket into associated studs arranged behind the wall. One aspect of the present invention is that the no-stud mounting system also includes a structure to facilitate securely mounting a wall bracket into sheetrock with enhanced pullout and sheer strength from the sheetrock wall. This aspect of the present invention represents an improvement over prior art systems as it includes a combination of an elongated angled flane with apertures for nails along with separate slots on a relatively flat face that can accommodate dry wall anchors, screws, or the like.

Yet another aspect of the present invention provides a structure to facilitate the lateral adjustability of a TV bracket on a wall bracket so that a flat panel display can be adjusted in a desired horizontal position while the TV bracket is locked into a secured position against upward movement on the associated wall bracket.

In an even further aspect of the present invention, a flat panel mounting system for mounting a flat panel display on a wall includes a TV bracket having an elongated panel adapted to be mounted to a flat panel display. The elongated panel has a top portion and a flange extending downwardly and outwardly from the top portion. The flange has a distal end and a lip extending upwardly from the distal end. The system also includes a wall bracket adapted to be mounted adjacent to a wall. The wall bracket includes an elongated panel having an upper portion and a lower portion, and a bottom flange extending upwardly and outwardly from the lower portion. The wall bracket further includes a flapper attached to the panel and is adapted for movement between a forward position and a rearward position. The flapper is biased toward the forward position. The TV bracket is adapted to be placed on the wall bracket in an assembled position such that the respective flanges are adjacent to each other while the lip of the TV bracket and a portion of the flapper of the wall bracket coact to prevent removal of the TV bracket from an assembled position on the wall bracket.

In addition, the flat panel mounting system may include a spring operatively associated with the flapper to bias the flapper toward the forward position. Also, the forward position of the flapper may be a locking position whereby the TV bracket is precluded from substantial vertical movement from assembled position on the wall bracket. A toggle assembly may be interactively connected to the flapper to move the flapper from its forward position to its rearward position whereby the TV bracket can be readily removed from assembled position on the wall bracket. The toggle assembly may comprise an arm arranged adjacent to the spring to compress the spring such that the flapper moves from its forward position to a rearward position. A locking structure may also be provided to secure the flapper in its rearward position upon activation by the toggle assembly such that the TV bracket can readily be removed from the wall bracket. The toggle assembly may comprise a cord connected to facilitate compression of the spring so that the flapper can be moved between its forward and rearward positions.

Continuing with this aspect, the flat panel mounting system may include a top flange extending from an upper portion of the elongated panel. The top flange may have a plurality of apertures therein. The elongated panel may also have apertures aligned with the apertures in the flange such that nails can extend at a downward angle through the apertures of the flange and elongated panel whereby the wall bracket can be secured to a sheetrock wall. The elongated panel of the wall bracket may further include at least one additional aperture for receiving an anchor to facilitate mounting of the wall bracket on a wall. The flanges of the TV bracket and wall bracket may be arranged at angles sufficient to permit the TV bracket to tilt away from a wall when in assembled position on the wall bracket while the TV bracket remains securely mounted against vertical movement.

Furthermore, the bottom flange and the elongated panel of the wall bracket may define a mounting region for supporting the TV bracket. The wall plate may further include safety plates connected to the bottom flange at opposing ends of the mounting region. The flange of the TV bracket may be arranged within the mounting region and adapted for lateral movement therein while remaining secured against substantial vertical movement on the wall bracket. The safety plates may define outer limits of permitted lateral movement of the TV bracket when in assembled position on the wall bracket.

In a still further aspect of the present invention, a flat panel mounting system for mounting a flat panel display on a wall includes a TV bracket having an elongated panel adapted to be mounted to a flat panel display. The elongated panel has a top portion and a flange extending from the top portion. The flange has a distal end and a lip extending upwardly from the distal end. The system also includes a wall bracket adapted to be mounted adjacent to a wall. The wall bracket includes an elongated panel having an upper portion and a lower portion, and a bottom flange extending from the lower portion. The wall bracket further includes a flapper attached to the panel and is adapted for movement between a forward position and a rearward position. The flapper is biased toward the forward position wherein the forward position of the flapper is a locking position whereby the lip of the TV bracket and a portion of the flapper of the wall bracket coact to prevent substantial vertical movement and removal of the TV bracket from assembled position when arranged on the wall bracket.

Additionally, the flat panel mounting system may include a spring operatively associated with the flapper to bias the flapper toward the forward position. A toggle assembly interactively connected to the flapper may be provided to move the flapper from its forward position to its rearward position whereby the TV bracket can be readily removed from assembled position on the wall bracket. The toggle assembly may comprise an arm arranged adjacent to the spring to compress the spring such that the flapper moves from its forward to a rearward position. A locking structure may be provided to secure the flapper in its rearward position upon activation by the toggle assembly such that the TV bracket can readily be removed from the wall bracket. The toggle assembly may further comprise a cord connected to facilitate compression of the spring so that the flapper can be moved between its forward and rearward positions.

Continuing with this aspect, the wall bracket may further include a top flange extending from an upper portion of the elongated panel. The top flange may have a plurality of apertures therein. The elongated panel may also have apertures aligned with the apertures in the flange such that nails can extend at a downward angle through the apertures of the flange and elongated panel whereby the wall bracket can be secured to a sheetrock wall. The flanges of the TV bracket and wall bracket may be arranged at angles sufficient to permit the TV bracket to tilt away from a wall when in assembled position on the wall bracket while the TV bracket remains securely mounted against vertical movement. The bottom flange and the elongated panel of the wall bracket may define a mounting region for supporting the TV bracket. The wall plate may further comprise safety plates connected to the bottom flange at opposing ends of the mounting region. The flange of the TV bracket may be arranged within the mounting region and adapted for lateral movement therein while remaining secured against substantial vertical movement on the wall bracket. The safety plates may define outer limits of permitted lateral movement of the TV bracket when in assembled position on the wall bracket.

BRIEF DESCRIPTION OF THE DRAWINGS

The features, aspects, and advantages of the present invention will become better understood with regard to the following description, appended claims, and accompanying drawings in which:

FIG. 7A is a front perspective view of the flat panel display wall mount system including the TV bracket of FIG. 6A engaged to the wall bracket of FIG. 1A.

FIG. 7B is a side perspective view of the system of FIG. 7A with the flapper of the wall mount system in the engaged position.

FIG. 7C is a side perspective view of the system of FIG. 7A with the flapper of the wall mount system in the engaged position.

DETAILED DESCRIPTION

Figure 3A:
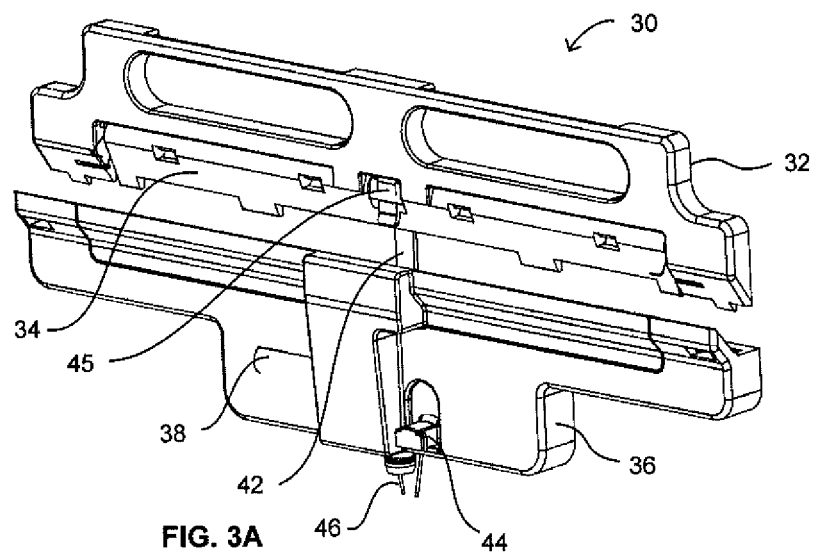
FIG. 3A is perspective view of a flapper assembly of the wall bracket of FIG. 1A.
Figure 3B:
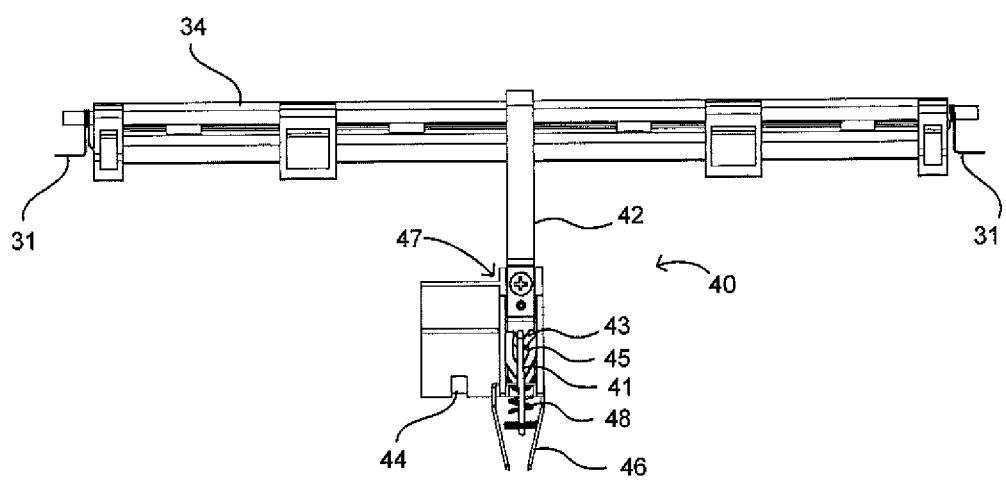
FIG. 3B is a back view of a locking mechanism and flapper of the flapper assembly of FIG. 3A.
Figure 4A:
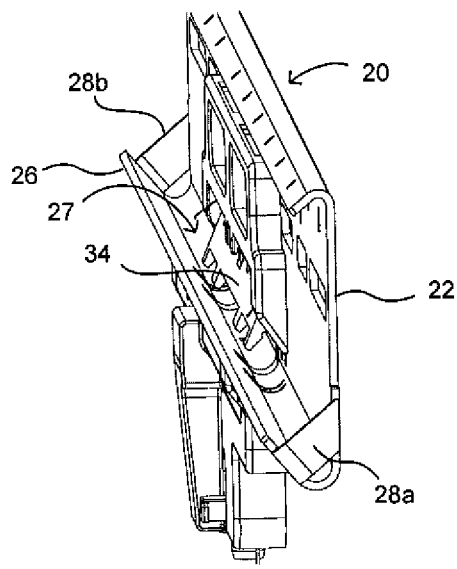
FIG. 4A is a side perspective view of the wall bracket of FIG. 1A while the flapper thereof is in an engaged position.
Figure 4B:
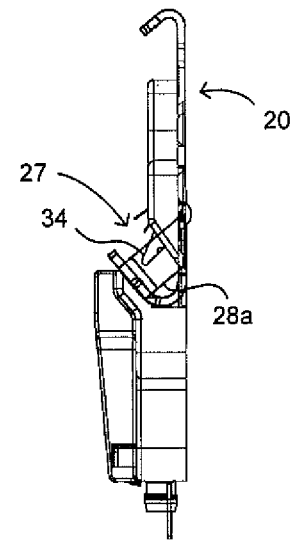
FIG. 4B is a partially transparent side view of the wall bracket of FIG. 5B.
Figure 5A:
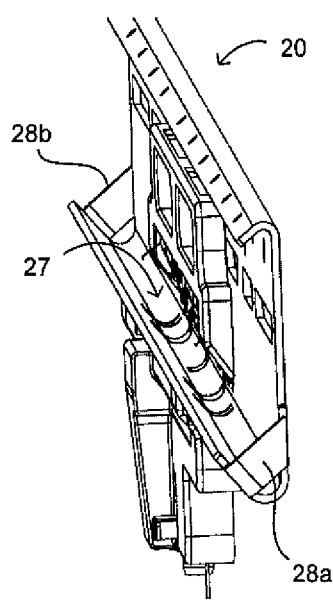
FIG. 5A is a side perspective view of the wall bracket of FIG. 1A while the flapper thereof is in a disengaged position.

A preferred embodiment of a flat panel display wall mount system 10 (see FIG. 7A) includes a wall bracket 20 and a TV bracket 50. The wall bracket 20 is depicted in FIGS. 1A-5B and includes an elongate flat panel section 22 adapted to be mounted adjacent to an associated wall, such as a wall constructed of sheetrock. A downwardly extending angled flange 24 extends from the top of flat panel section 22, and an upwardly and outwardly extending flange 26 extends from a bottom of flat panel section 22. A laterally extending channel 27 is defined between flange 26 and flat panel section 22, as best shown in FIG. 5A. Safety plates 28a-b extend between flange 26 and flat panel section 22 at lateral extents thereof to define lateral boundaries of channel 27.

Figure 1A:
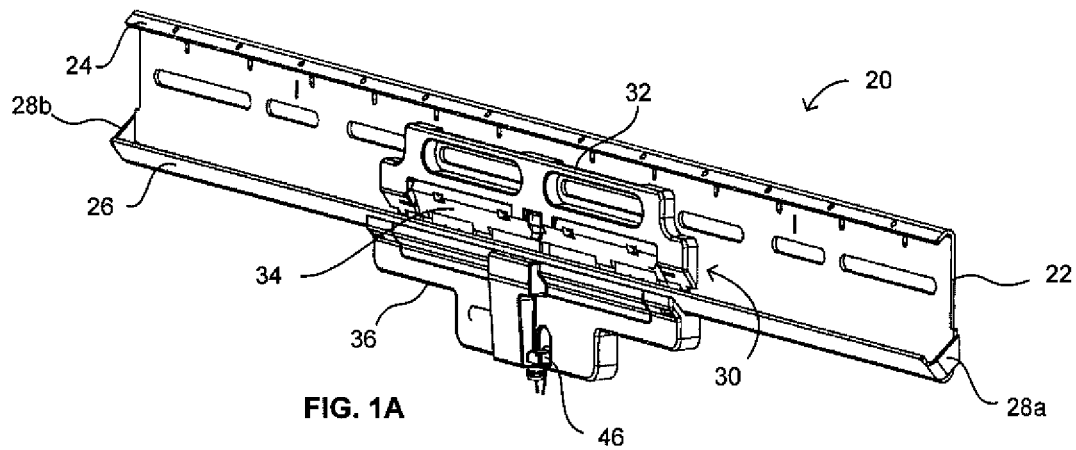
FIG. 1A is a front perspective view of a wall bracket of a flat panel display wall mount system according to an embodiment of the present disclosure.
Figure 1B:
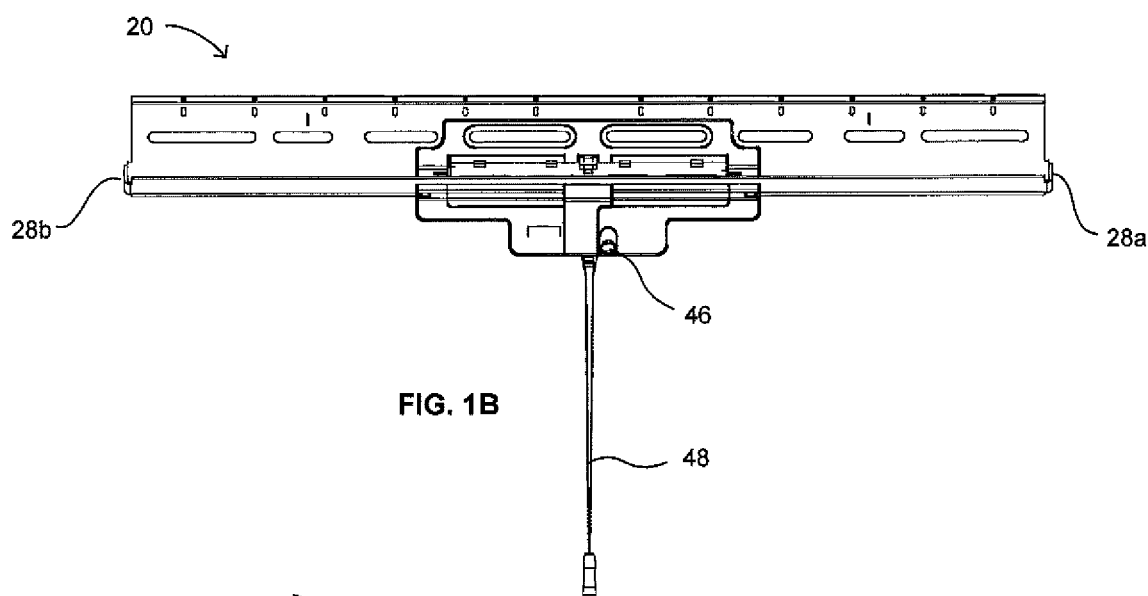
FIG. 1B is a front view of the wall bracket of FIG. 1A.
Figure 2:
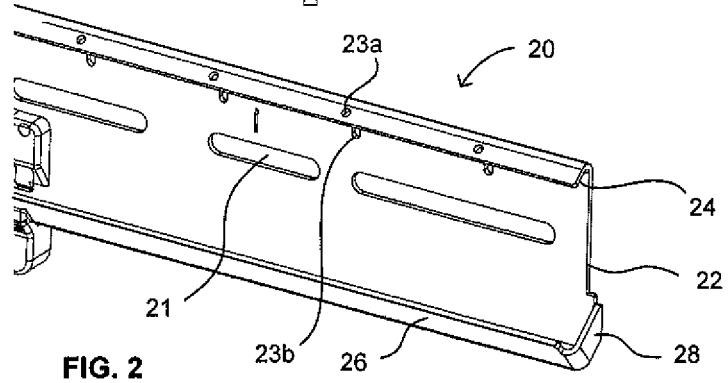
FIG. 2 is an enhanced partial perspective view of the wall bracket of FIG. 1A.

Angled flange 24 includes a plurality of apertures 23a adapted to receive a fastener such as a nail, as best shown in FIG. 2. Corresponding vertical elongated apertures 23b are arranged through a top area of flat panel section 22. Each aperture 23a of the angled flange 24 is aligned with an associated aperture 23b of flat panel section 22 so as to allow a nail to be received in the associated pairs of apertures 22a-b so that such nail extends therethrough in an oblique angle (preferably a 45 degree angle) relative to flat panel section 22. This aspect of the present invention facilitates mounting of wall bracket 20 into a sheetrock wall without the need to directly mount it to wood or metal studs within the wall. In other words, the oblique angle of fasteners directed by apertures 23a-b maximizes the strength of a direct connection between wall mount 20 and sheetrock in the event it is undesirable or impracticable to mount wall bracket 20 directly to a wall stud. Thus, wall mount is designed to secure a flat panel display (not shown) and its associated TV bracket 50 on wall bracket 20 against a downward (vertical) force imposed by at least the combined weight of the flat panel display and wall mount system 10.

In order to provide additional pullout strength and prevent wall bracket 20 from pulling away from an associated wall, wall bracket 20 includes horizontally extending apertures 21 through which sheetrock wall anchors or screws can be secured directly into sheetrock. The combination of the use of nails and sheetrock wall anchors or screws provide enhanced no-stud mounting of the present wall bracket 20. However, such elongate apertures 21 allow wall bracket 20 to be optionally secured to one or more studs within a wall for added mounting strength. The elongate aspect of such slots 21 allows wall mount bracket 20 to be adjusted laterally along the wall to help facilitate centering of wall bracket 20 on the wall in the event wall bracket 20 is connected to a stud. However, apertures 23a-b facilitate no-stud mounting as described above such that it is not necessary for most applications to secure wall bracket 20 directly into one or more wall studs.

Figure 5B:
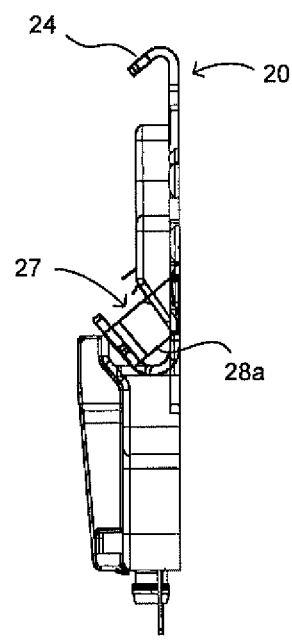
FIG. 5B is a partially transparent side view of the wall bracket of FIG. 4A.

Another advantageous feature of the flat panel wall mounting system 10 is the secure and easy attachment and removal of TV bracket 50 and an associated flat panel display to and from wall bracket 20. This is accomplished through a unique cooperating locking structure on wall bracket 20 and TV bracket 50. In particular wall bracket 20 further includes a locking flapper assembly 30, as depicted in detail in FIGS. 3A and 3B. The locking flapper assembly 30 includes a flapper housing 32 and a flapper actuating mechanism housing 36. Flapper housing 32 is connected to flat panel 22 and houses a flapper 34 which is hingedly connected thereto. Torsion springs 31 are connected to flapper housing 32 and flapper 34 to bias flapper 34 in a forward or locking position while allowing flapper 34 to be pivoted to a rearward or unlocking position. In the forward position, as shown in FIGS. 4A and 4B, flapper 34 is pivoted away from flat panel 22 so that flapper 34 extends into laterally extending channel 27. In the rearward position, as shown in FIGS. 5A and 5B, flapper 34 is retracted into flapper housing 32 so as to clear channel 37 for receipt or removal of TV bracket 50, as described in more detail below.

The flapper actuating mechanism housing 36 is connected to a bottom of flange 26 and panel 22 and houses a bubble level 38 and an actuating mechanism 40 that can be actuated to resist the bias of flapper 34 to move flapper 34 to the rearward position and hold flapper 34 in the rearward position. The actuating mechanism 40, which is best shown in FIG. 3B, can also be actuated to release flapper 34 so that flapper 34 can return to its forward position. The actuating mechanism 40 generally includes a hook arm or slide arm 42, shuttle 47, compression spring 48, pin 41, cord 46 and toggle switch 44. Hook arm 42 is connected to shuttle 47 and is moveable therewith. A hook end 45 (see FIG. 3A) of hook arm 42 is hooked onto a top end of flapper 34 and is moveable relative to flapper 34 so that when hook arm 42 is in a lower or engaged position, hook end 45 of hook arm 42 pushes flapper 34 into its rearward position. However, when hook arm 42 is in an upper or disengaged position, hook end 45 of hook arm 42 sufficiently disengages flapper 34 so as to provide flapper 34 with enough clearance to move under its own bias to the forward position.

The shuttle 47 and hook arm 42 can be moved between the upper and lower positions via compression spring 48. Compression spring 48 pushes against housing 36 and shuttle 47 so as to bias shuttle 47 in the upward position. Pin 41 is attached to housing 36 and is slidable along a cam surface 43 defined by shuttle 47 when shuttle 47 is moved in an up-down direction. A toggle switch 44 and cord 46 are connected to shuttle 47 so that when a user pushes down on switch 44 or pulls down on cord 46, the shuttle 47 moves down against the bias of spring 48 and pin 41 follows cam surface 43. In this regard, when a user pulls or pushes shuttle 47 down a first time against the bias of compression spring 48, the pin 41 follows cam surface 43 until it is captured by a retainment tab 45 of shuttle 47 which is positioned adjacent cam surface 43. When this occurs, hook arm 42 is in the downward position and flapper 34 is positioned in its rearward position. The pin 41 and tab 45 interaction holds shuttle 47 in the downward position against the bias of compression spring 48. When the user pulls or pushes down a second time on shuttle 47, the pin 41 follows cam surface 43 away from retainment tab 45 thereby allowing shuttle 47 to return to the upward position under the bias of compression spring 47 and to release flapper 34 from hook end 45 of hook arm 42 so that flapper 34 can return to its forward position.

Figure 6A:
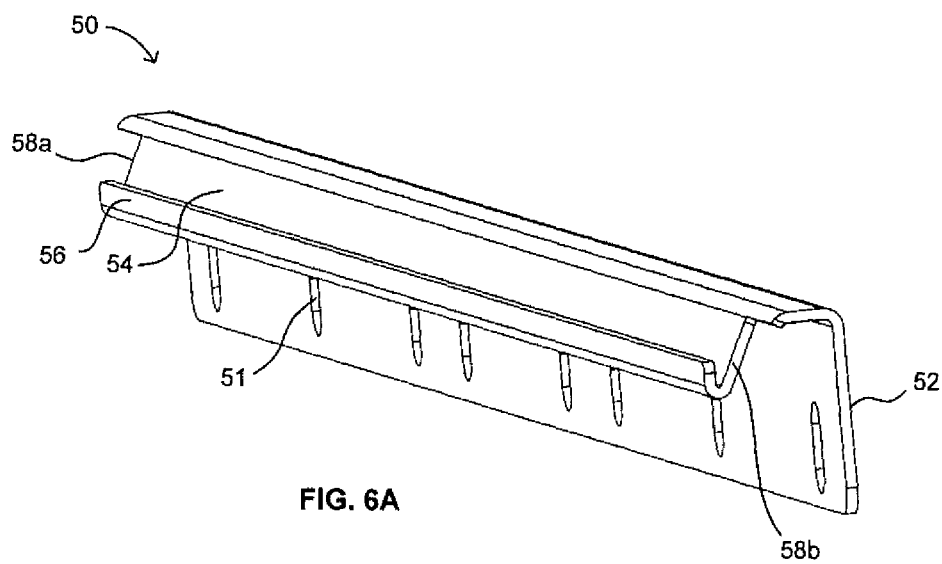
FIG. 6A is a rear perspective view of a TV bracket of the flat panel display wall mount system according to an embodiment of the present disclosure.
Figure 6B:
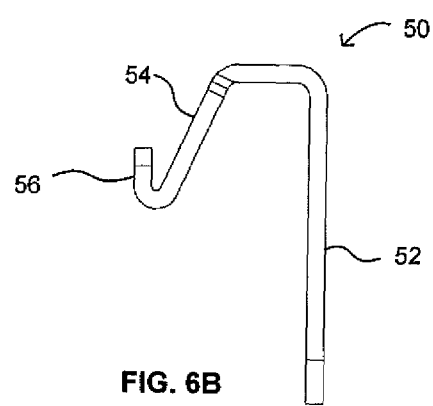
FIG. 6B side view of the TV bracket of FIG. 6A.

The TV bracket 50, which is depicted in FIGS. 6A and 6B, is designed to be directly secured to the rear of a flat panel display (not shown). In addition, TV bracket 50 is configured to be supported by wall bracket 20 and to cooperate or coact with flapper 34 of the locking flapper assembly 30 so as to secure TV bracket 50 to wall bracket 20. In this regard, TV bracket 50 includes a flat elongated section 52 which includes a plurality of vertically elongated apertures 51 for accommodating screws used to secure the TV bracket to the rear of a flat panel display. The apertures 51 are designed to be aligned with a mounting pattern of threaded inserts on the rear of the flat panel display for receiving threaded mounting screws. For example, a flat panel TV display may have a mounting pattern of 100 by 100 mm or 200 by 200 mm on its rear surface (or any other mounting pattern) to align with apertures 51.

The TV bracket 50 also includes a downwardly and outwardly extending flange 54 and an upwardly extending lip 56 at the end thereof. Flange 54 and lip 56 have lateral extents 58a-b that define a length therebetween. Such length is smaller than a length of elongate section 52. The cooperation between the flange 54 and the lip 56 with the spring-biased flapper 34 of the wall bracket 20 facilitates the advantageous locking design of the present invention, as is described in more detail below.

Figure 7D:
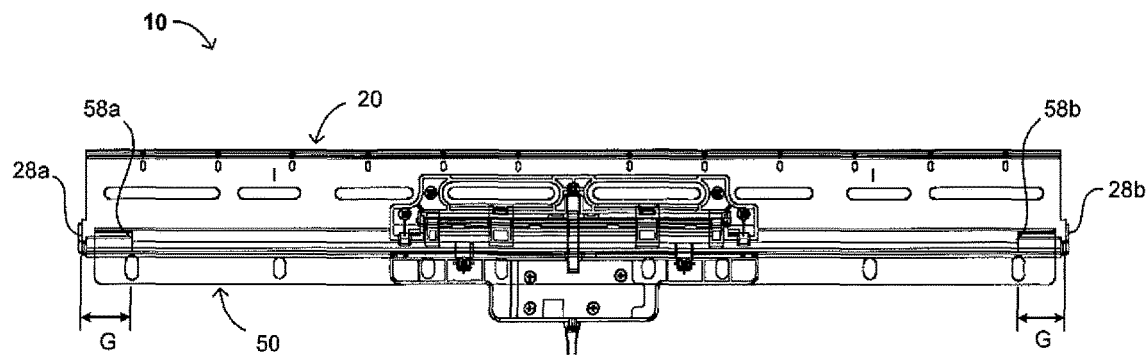
FIG. 7D is a partially transparent back view of the system of FIG. 7A.

FIGS. 7A-7F depict the assembled flat panel display wall mount system 10. In this regard, TV bracket 50 may be connected to wall mount 20 while wall mount 20 is in an automatic securing state. In this state, flapper 34 is in its forward position prior to TV bracket 50 being connected to wall bracket 20. More particularly, after the TV bracket 50 is secured by screws or other mounting members to an associated flat panel display (not shown), it may then be placed onto wall bracket 20, which is attached to a wall. The extension flange 54 and lip 56 are placed into channel 27, as best shown in FIGS. 7B and 7C. As the extension flange 54 and lip 56 are placed into channel, lip 56 pushes against flapper 34 which is in its forward position. This pushes flapper 34 toward its rearward position thereby providing clearance for lip 56 and flange 54 to be received in channel 27. Once lip 56 clears a bottom edge of flapper 34, the flapper 34 returns to its forward position in which the bottom edge of flapper 34 protrudes into channel 27 to a location between flange 54 and lip 56 of TV bracket 50, as best shown in FIG. 7B. In this regard, flapper 34 coacts with lip 56 to prevent TV bracket from being vertically removed from channel 27 while allowing TV bracket 50 to move laterally relative to wall bracket 20. In addition, as just described, flapper 34 can provide automatic locking where user does not need to separately actuate flapper 34 to lock TV bracket 50 to wall bracket 20. Thus, when TV bracket 50 is connected to wall bracket 20, TV bracket 50 and a flat panel display carried by such bracket 50 may be automatically secured by flapper 34.

With regard to the locking design of the present invention, a user may choose to override the automatic locking feature described above by pulling on cord 48, which will then toggle the flapper 34 between an automatic locked state and an unlocked state. In normal operation, as described above, when the lock system is configured to automatically lock TV bracket 50 onto wall bracket 20, the TV bracket 50 will initially push the hinged movable flapper 34 from its forward position to its rearward position as the angled surface associated with lip 56 is placed in channel 27. The lip 56 will then automatically become engaged beneath the movable flapper 34 so that the TV bracket 50 will automatically become secured to the wall bracket 20 against upward movement when placed thereon. This aspect of the present invention provides a safety feature where a user need not remember to perform any additional steps to secure the associated flat panel display and its TV bracket to a wall plate after it is placed in assembled position.

However, a further advantage of the structure and operation of the invention is that wall mount 20 can be easily transitioned to the unlocked state so that TV bracket 50 can be removed from wall bracket 20 when desired. In this regard, cord 48 can be pulled or toggle switch 46 pushed causing shuttle 47 and hook arm 42 to move into the downward position. Hook end 45 then engages flapper 34 to force flapper 34 toward the rearward position, thereby freeing channel 27 to allow TV mount 50 to be removed vertically therefrom. Pin 41 holds shuttle 47 and hook arm 42 in this position until it is released by the user back into the automatic locking state.

While the cooperation of flapper 34 and the TV bracket 50 automatically prevents removal of the TV bracket 50 and the associated flat panel display from wall bracket 20, another advantageous feature of the present invention permits a user to tilt an associated flat panel display away from the wall so that electrical and audio/video connections can be accessed along with other controls arranged on the rear surface of the associated flat panel display. This advantageous "tilt" feature is depicted by the arrow in FIG. 7C and is obtained through the cooperation between angled flange 26 of wall bracket 20 and angled flange 54 of TV bracket 50. In addition, the positioning of the flapper 34 relative to lip 56 provides sufficient clearance so as to allow TV bracket 50 to be pivoted within channel 27 and about an axis extending along a length of TV bracket 50 while still providing the above mentioned safety advantage. A unique aspect of the present invention is that the tilt feature permits a user to readily access the rear portion of an associate flat panel display while the display remains securely engaged to the wall bracket 20.

Figure 7E:
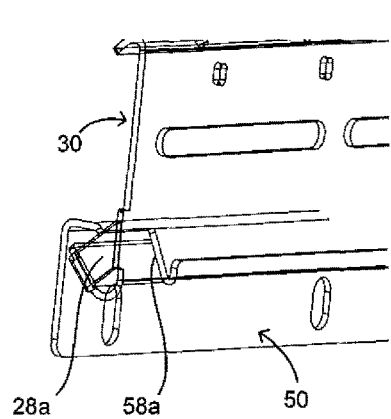
FIG. 7E is a partially transparent enhanced back perspective view of the system of FIG. 7A.
Figure 7F:
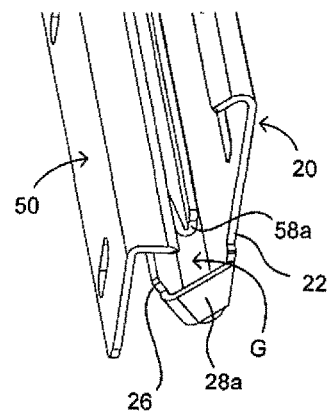
FIG. 7F is an enhanced partial top perspective view of the system of FIG. 7A.

An even further advantageous feature of the present system 10 is the cooperating structure of TV bracket 50 and wall bracket 20, which provides a user with the ability to laterally (horizontally) adjust TV bracket 50 and thus the location of the associated flat panel display in relation to wall bracket 20. This feature is depicted in FIGS. 7D-7F as a gap "G" that extends between lateral extents 58a-b of the lip 56 and flange 54 and the safety plates 28a-b of wall bracket 20. In other words, the downwardly extending flange 54 preferably has an overall width in the horizontal direction, which is shorter than the overall width in the horizontal direction of channel 27 between safety plates 28a-b. When the TV bracket 50 is mounted on wall bracket 20, the flange 54 is preferably also shorter than cooperating flange 26. Thus, there is a predetermined distance "G" between the ends 58a-b of flange 54 and the opposing safety plates 28a-b of wall bracket 20. This distance permits laterally slidable movement of TV bracket 50 while being secured against vertical movement via flapper 34. The safety plates 28a-b thus provide an outer limit for lateral movement of TV bracket 50 thus securing TV bracket 50 laterally to wall bracket 20.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention.

The invention claimed is:

1. A flat panel mounting system for mounting a flat panel display on a wall, the flat panel mounting system comprising:
   a television bracket having an elongated panel adapted to be mounted to a flat panel display, the elongated panel having a top portion and a flange extending downwardly and outwardly from the top portion, the flange having a distal end and a lip extending upwardly from the distal end;
   a wall bracket adapted to be mounted adjacent to a wall, the wall bracket including an elongated panel having an upper portion and a lower portion, and a bottom flange extending upwardly and outwardly from the lower portion, the wall bracket further including a flapper attached to the panel and being adapted for movement between a forward position and a rearward position, the flapper being biased toward the forward position, wherein the television bracket is adapted to be placed on the wall bracket in assembled position such that the respective flanges are adjacent to each other while the lip of the television bracket and a portion of the flapper of the wall bracket coact to prevent removal of the television bracket from assembled position on the wall bracket;

a spring operatively associated with the flapper to bias the flapper toward the forward position; and a toggle assembly interactively connected to the flapper to move the flapper from its forward position to its rearward position whereby the television bracket can be readily removed from assembled position on the wall bracket, wherein the toggle assembly comprises a cord connected to facilitate compression of the spring so that the flapper can be moved between its forward and rearward positions.

2. The flat panel mounting system of claim 1 wherein the forward position of the flapper is a locking position whereby the TV bracket is precluded from substantial vertical movement from assembled position on the wall bracket.

3. The flat panel mounting system of claim 1 wherein the toggle assembly comprises an arm arranged adjacent to the spring to compress the spring such that the flapper moves from its forward to a rearward position.

4. The flat panel mounting system of claim 1 further comprising a locking structure to secure the flapper in its rearward position upon activation by the toggle assembly such that the television bracket can readily be removed from the wall bracket.

5. The flat panel mounting system of claim 1 wherein the wall bracket further comprises a top flange extending from an upper portion of the elongated panel, the top flange having a plurality of apertures therein, the elongated panel also having apertures aligned with the apertures in the flange such that nails can extend at an downward angle through the apertures of the flange and elongated panel whereby the wall bracket can be secured to a sheetrock wall.

6. The flat panel mounting system of claim 5 wherein the elongated panel of the wall bracket further comprises at least one additional aperture for receiving an anchor to facilitate mounting of the wall bracket on a wall.

7. The flat panel mounting system of claim 6 wherein the flanges of the television bracket and wall bracket are arranged at angles sufficient to permit the television bracket to tilt away from a wall when in assembled position on the wall bracket while the television bracket remains securely mounted against vertical movement.

8. The flat panel mounting system of claim 1 wherein the bottom flange and the elongated panel of the wall bracket define a mounting region for supporting the television bracket, the wall plate further comprising safety plates connected to the bottom flange at opposing ends of the mounting region, the flange of the television bracket being arranged within the mounting region and adapted for lateral movement therein while remaining secured against substantial vertical movement on the wall bracket, the safety plates defining outer limits of permitted lateral movement of the television bracket when in assembled position on the wall bracket.

9. A flat panel mounting system for mounting a flat panel display on a wall, the flat panel mounting system comprising:

a television bracket having an elongated panel adapted to be mounted to a flat panel display, the elongated panel having a top portion and a flange extending from the top portion, the flange having a distal end and a lip extending upwardly from the distal end;

a wall bracket adapted to be mounted adjacent to a wall, the wall bracket including an elongated panel having an upper portion and a lower portion, and a bottom flange extending from the lower portion, the wall bracket further including a flapper attached to the panel and being adapted for movement between a forward position and a rearward position, the flapper being biased toward the forward position wherein the forward position of the flapper is a locking position whereby the lip of the television bracket and a portion of the flapper of the wall bracket coact to prevent substantial vertical movement and removal of the television bracket from assembled position when arranged on the wall bracket;

a spring operatively associated with the flapper to bias the flapper toward the forward position; and a toggle assembly interactively connected to the flapper to move the flapper from its forward position to its rearward position whereby the television bracket can be readily removed from assembled position on the wall bracket, wherein the toggle assembly comprises a cord connected to facilitate compression of the spring so that the flapper can be moved between its forward and rearward positions.

10. The flat panel mounting system of claim 9 wherein the toggle assembly comprises an arm arranged adjacent to the spring to compress the spring such that the flapper moves from its forward to a rearward position.

11. The flat panel mounting system of claim 9 further comprising a locking structure to secure the flapper in its rearward position upon activation by the toggle assembly such that the television bracket can readily be removed from the wall bracket.

12. The flat panel mounting system of claim 9 wherein the wall bracket further comprises a top flange extending from an upper portion of the elongated panel, the top flange having a plurality of apertures therein, the elongated panel also having apertures aligned with the apertures in the flange such that nails can extend at an downward angle through the apertures of the flange and elongated panel whereby the wall bracket can be secured to a sheetrock wall.

13. The flat panel mounting system of claim 12 wherein the flanges of the television bracket and wall bracket are arranged at angles sufficient to permit the television bracket to tilt away from a wall when in assembled position on the wall bracket while the television bracket remains securely mounted against vertical movement.

14. The flat panel mounting system of claim 9 wherein the bottom flange and the elongated panel of the wall bracket define a mounting region for supporting the television bracket, the wall plate further comprising safety plates connected to the bottom flange at opposing ends of the mounting region, the flange of the television bracket being arranged within the mounting region and adapted for lateral movement therein while remaining secured against substantial vertical movement on the wall bracket, the safety plates defining outer limits of permitted lateral movement of the television bracket when in assembled position on the wall bracket.

* * * * *